United States Patent Office 3,495,107
Patented Feb. 10, 1970

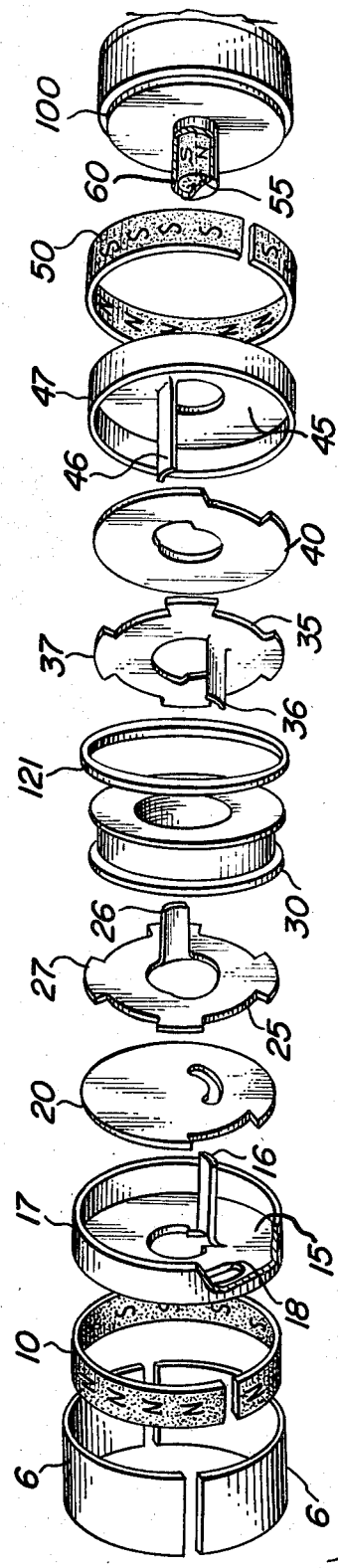
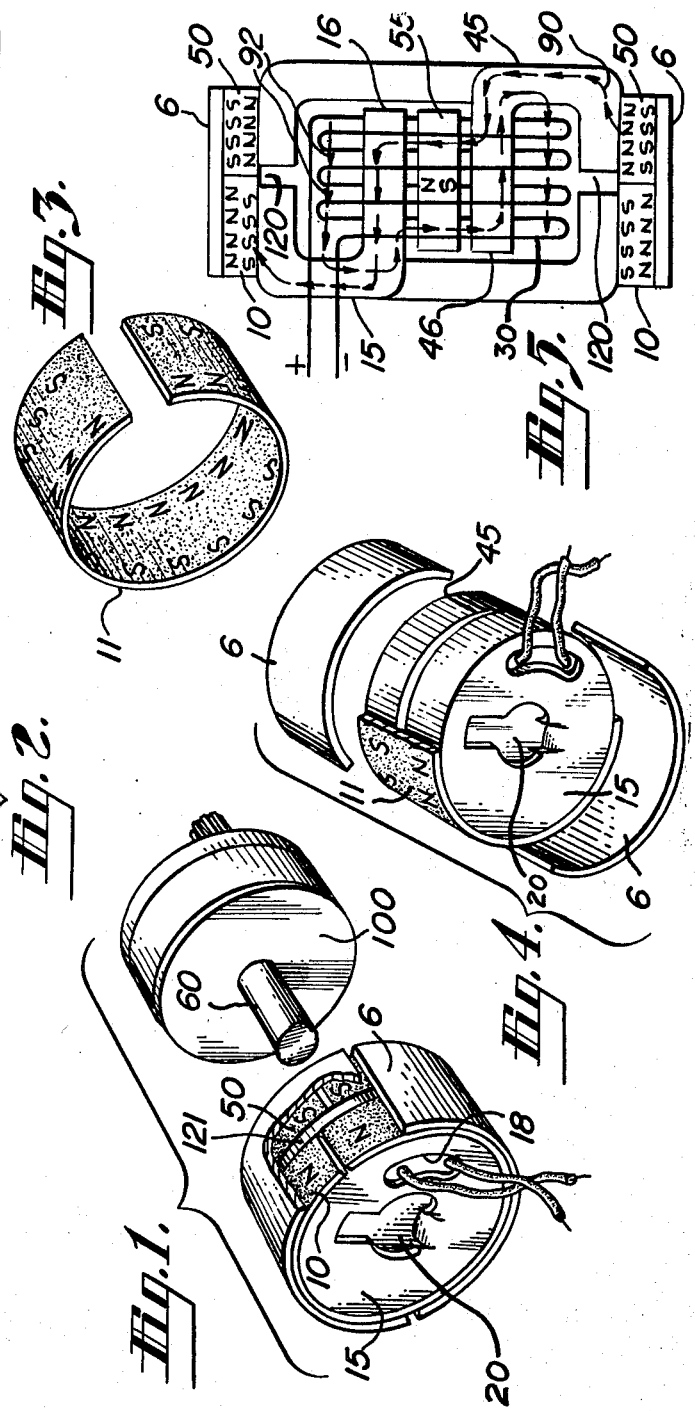

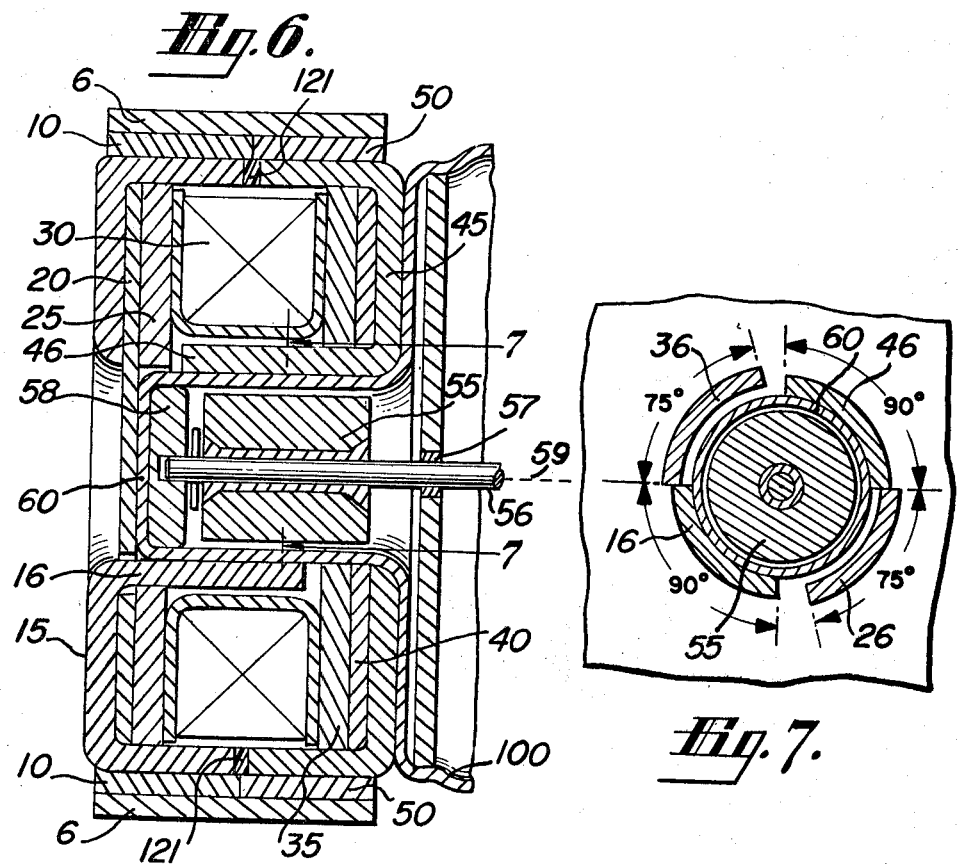
Fig. 6.
Fig. 7.
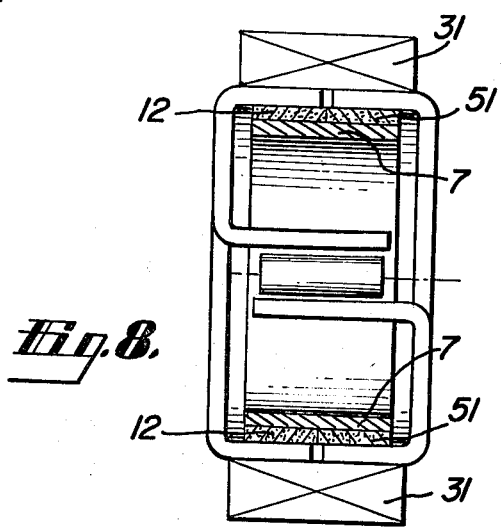
Fig. 8.

3,495,107
CYLINDRICAL STEPPER MOTOR HAVING A STATOR BIASING MAGNET
Arthur W. Haydon, Middlebury, Conn., assignor, by mesne assignments, to Tri-Tech, Inc., Waterbury, Conn., a corporation of Connecticut
Continuation-in-part of application Ser. No. 617,529, Feb. 21, 1967. This application Apr. 28, 1969, Ser. No. 819,562
Int. Cl. H02k 37/00, 21/12
U.S. Cl. 310—49        24 Claims

ABSTRACT OF THE DISCLOSURE

A stepper motor having a field coil, a permanent magnet rotor, two stator halves enclosing both the rotor and the coil, each half including a pair of salient poles, the assembled poles forming an arcuate array disposed around the rotor in spaced relation thereto, one of the salient poles in each half being closer to the rotor than the other pole to define a nonuniform air gap between the rotor and the stator, means for shading the poles closest to the rotor, and a permanent magnet mounted on the stator halves which generates a bias flux in opposition to the flux of the field coil for producing a predetermined rotor advance with each electrical pulse applied to the coil.

CROSS-REFERENCE TO RELATED APPLICATION

This application is a continuation-in-part of copending application Ser. No. 617,529, filed Feb. 21, 1967, by Arthur W. Haydon for Electric Rotating Machinery.

BACKGROUND OF THE INVENTION

The present invention relates to small motors of novel design and more particularly to small stepper motors.

Many prior stepper motors require more than a two-wire input and furthermore do not give a full 360° mechanical rotation upon the application of but a single input pulse. When such motors are small their power output is frequently only nominal. An additional disadvantage is that it often has been necessary heretofore to incorporate devices such as mechanical switches in the stator field coil circuit and mechanical "no-back" structures for ensuring unidirectional starting, both of which require a comparatively high degree of maintenance to operate properly.

The present invention overcomes these and other disadvantages by a novel design which additionally simplifies the manufacturing process of such stepper motors.

SUMMARY OF THE INVENTION

In a preferred embodiment, the present invention includes a permanent magnet rotor and a centrally orificed stator structure comprising two outer and two inner pole pieces each having a salient pole. The salient poles are arranged with respect to the rotor such that all of the poles form an arcuate array around the rotor in spaced relation thereto, with selected ones of the salient poles being closer to the rotor than other poles to define a nonuniform air gap between the rotor and the stator. A field coil coaxially encircles the stator structure for generating a magnetic flux therein which passes through the rotor. The outer pole pieces include cup-shaped portions which serve as a cover for the motor and are provided with permanent magnet means in magnetic circuit relationship therewith for generating a magnetic biasing flux. The biasing flux passes through the rotor with a strength and direction which is respectively less than and opposed to the flux generated by the field coil.

The nonuniform air gap spacing of the salient stator poles and the use of shaded stator poles helps to ensure that the rotor will consistently be self-starting in the same direction with each unipolar pulse of electrical potential applied to the field coil. The distortion of the flux pattern and the reduction in gap reluctance due to the nonuniform air gap causes the rotor to consistently stop with a rotor pole of a given polarity always aligned opposite one of the shaded stator poles. In this quiescent stopping position of the rotor the biasing flux from the permanent magnet means predetermines the polarity of the rotor pole in alignment with the shaded stator pole. The rotor thus stops in its most favorable starting position. Upon the application of the next unipolar pulse to the field coil, a selected one of the adjacent unshaded stator poles is of a polarity opposite to that of the predetermined rotor pole, with the result that the rotor starts substantially instantaneously in the prescribed direction.

The stator structure is designed to provide both a housing for the coil and rotor and a mounting for the permanent magnet biasing means. The biasing means may be easily detached from the housing, thereby allowing the motor to be quickly and easily converted to a synchronous motor, for example.

It is therefore an object of the present invention to provide a stepper motor of small size and simple construction which has a surprisingly high power output.

It is another object of this invention to provide an improved two-wire stepper motor requiring no external logic switching circuitry for operation and capable of rotating a full 360 mechanical degrees upon application of a single pulse.

It is a still further object of the present invention to provide a small, cylindrical stepper motor having low maintenance requirements.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIGURE 1 is a perspective view of the stator structure of one embodiment of this invention, with a portion of the magnetic biasing means exposed, along with the adjacent rotor housing;

FIGURE 2 is a perspective exploded view of the embodiment of FIGURE 1;

FIGURE 3 is a perspective view of the magnetic biasing means of a second embodiment of this invention;

FIGURE 4 is a perspective exploded view of the second embodiment of this invention partially revealing the magnetic biasing means of FIGURE 3;

FIGURE 5 is a schematic representation of the magnetic circuit of the embodiment of FIGURES 1 and 2;

FIGURE 6 is a vertical section view of the embodiment of FIGURES 1 and 2, with a portion of the rotor housing shown broken away.

FIGURE 7 is a schematic cross sectional view of the rotor of FIGURE 6 showing the arrangement of the stator poles;

FIGURE 8 is a partially schematic sectional view of a third embodiment of this invention.

DESCRIPTION OF PREFERRED EMBODIMENTS

Referring now more particularly to FIGURES 1 and 2, a preferred embodiment of a stepper motor according to the invention, comprises a stator structure and housing containing the rotor and suitable output gearing. The stator structure includes stator pole piece members 15, 25, 35 and 45, each comprising a centrally orificed disc and only a single stator pole extending perpendicularly from the edge of a portion of the orifice. The discs are stacked in pairs, the discs, in each pair being interfitted together. The shading rings 20 and 40 are composed of nonmagnetic conductors such as aluminum or copper and fit respectively between the discs 15 and 25 and the discs 35 and 45. The stator poles 16 and 26 project from the central orifices of their respective discs 15 and 25 and are positioned to form one sector of the pole piece array, while the stator poles 36 and 46 similarly project from their respective discs 35 and 45 and are positioned to form the other and opposite sector.

The shaded outer pole pieces 15 and 45 are of cup-shaped configuration and are provided with respective flanges 17 and 47. These flanges are not in contact with each other and function as the cover for the motor. As best shown in FIGURES 2 and 5, the assembled motor has a gap 120 between stator pieces 15 and 45 which is occupied by insulating washer 121.

The unshaded inner pole pieces 25 and 35, on the other hand, are flat and are of a diameter somewhat less than the inside diameter of the outer pole piece flanges 17 and 47 throughout the major portion of their periphery. The pole piece 25 includes four equally spaced extensions 27 which contact the flange 17. Likewise the pole piece 35 includes four equally spaced extensions 37 which contact the flange 47. The extensions 27 and 37 form portions of the magnetic return path for the unshaded poles and carry the return flux through the cover of the motor. Because of the spaces between the extensions, the magnetic reluctance of the return path for the unshaded poles differs from that for the shaded poles, with the result that there is provided an extremely efficient flux relationship between the two sets of poles.

The width and angular disposition of each pole is such that the shaded pole in one pole piece group is in contact with the unshaded pole in the opposite group. As best shown in FIGURE 7, this may be done by making the shaded poles 16 and 46 of ninety degree angular extent and the unshaded poles 26 and 36 of seventy-five degree angular extent, with a fifteen degree spacing between the shaded and unshaded poles in the same group, that is, the poles which are of like polarity. The peripheral orientation of the poles is such that the shaded poles are opposite each other and the unshaded poles are also opposite each other.

The ability of the motor to consistently start in the same direction in response to an applied voltage is determined by the position in which the rotor stops upon the preceding de-energization of the field coil. To assist in making sure that the rotor stops in essentially the same position each time, the air gaps, namely, the stator pole to rotor spacings, are different for the shaded poles than for the unshaded poles. As best illustrated in FIGURE 7, this is accomplished by locating the shaded poles 16 and 46 at a lesser distance from the rotational axis 59 of the rotor 55 than the unshaded poles 26 and 36. The difference in distance advantageously may be half the thickness of the stator material.

As will be explained in further detail hereinafter, the rotor 55 comprises a solid cylinder of permanently magnetic material magnetized with a north (N) and a south (S) pole on opposite sides of the rotor axis 59. Because the rotor is of uniform diameter and is centered in the stator structure, the gaps between the rotor and shaded poles are less than the gaps between the rotor and the unshaded poles. This narrower gap between the rotor and the shaded stator poles reduces the reluctance of the magnetic circuit across the gap and causes the rotor to stop with its poles opposite the shaded poles of the stator. This helps position the rotor in the most advantageous position for starting. When current is applied to the field coil, the initial flux build-up occurs in the unshaded poles, and since the rotor is in line with the shaded poles there is produced a strong starting impulse.

The rotor 55 comprises a long cylinder of ceramic magnetic material which is magnetized permanently with opposite north and south poles, as indicated by N and S in FIGURE 2. A relatively "hard" material magnetically is used so as to have high coercivity, low permeability, a low specific gravity and a high magnetic energy product. For best results the magnetic energy product should be at least $3.0 \times 10^6$ gauss-oersteds along the axis of magnetic orientation. Representative examples of such materials are Ceramagnet A. A19 and A70 manufactured by Stackpole Carbon Company, Electronic Components Division, St. Marys, Pa., and Indox I and Indox V manufactured by Indiana General Corporation, Valparaiso, Ind. These are of Barium ferrite having a composition $BaFe_{12}O_{19}$. Another suitable material is Plastiform available from the Leyman Corporation, Cincinnati, Ohio. The rotor also may be fabricated from a 77% platinum, 23% cobalt material made by the Hamilton Watch Company of Lancaster, Pa. This latter material has a residual induction of 6,400 gauss, a coercive force of 4300 oersteds and a maximum energy product of $9.0 \times 16^6$ gauss-oersteds.

The rotor 55 is provided with an axial hole into which the shaft 56 is secured as by cementing, moulding or other suitable techniques. In some cases a series of comparatively thin washers of the magnetized material are placed in stacked relationship with each other and are adhesively held together to form the rotor. In other preferred embodiments, particularly in those using Plastiform, the Plastiform material may be extruded in tubular form, cut to length and pressed on the shaft.

Many prior stepper motors use a comparatively large number of stator and rotor poles. Such motors require a relatively large circumferential area of rotor surface to accommodate these poles in order to have a useful torque output. To obtain a large circumferential area the rotor must have a relatively large diameter when compared with its length. The rotational inertia of the rotor varies directly as the fourth power of its diameter, and thus a large diameter rotor will have a greater rotational inertia than a slim rotor. Large rotational inertia in the rotor is a particular disadvantage in a stepper motor, in which the rotor must respond quickly to electrical impulses applied to the field coil. In a preferred embodiment of this invention, there are employed only four long salient stator poles and a bipole rotor. This allows the use of a "slim" rotor, that is, one having a greater length than diameter, which has a low rotational inertia. Thus the rotor in a preferred embodiment is capable of substantially instantaneous starting and stopping with each pulse applied to the field coil.

The use of a long rotor increases the torque available to operate the motor. A relatively high torque is produced when the ratio of rotor length to diameter is within the range of from about 1.25 to 1 to about 2 to 1. It appears that a ratio of 1.5 to 1 is particularly suitable. The net usable torque falls off markedly when this ratio approaches 1 to 1.

Continuing now with the description of the embodiment shown in FIGURES 1 and 2, there are shown oppositely polarized permanent magnets 10 and 50 which are annular shaped strips of Plastiform tape. Permanent magnet 10 is wrapped around the outside of flange 17 and permanent magnet 50 is wrapped around the outside of flange 47. The gaps at the ends of the Plastiform strips as shown in FIGURE 2 are non-functional, and permanent-magnets 10 and 50 may be complete rings. The Plastiform strips are magnetized along their short dimension as shown in FIGURE 2. The inside of the ring-shaped permanent magnet 10 is a south pole and the outside is a north pole. The opposite polarities apply to ring-shaped permanent magnet 50, the inside of the magnet 50 being polarized north and the outside being polarized south.

A sleeve 6 (shown as having two portions in FIGURES 1 and 2) of magnetic material is affixed in magnetic circuit relationship with the permanent magnets 10 and 50 to provide a flux linkage for the outside surfaces of the magnets in order to enhance the magnetic flux available at the inside surfaces of the magnets. Specifically, sleeve 6 is affixed to magnets 10 and 50 such that the magnets lie between sleeve 6 and stator piece flanges 17 and 47.

Referring to FIGURE 5, the permanent magnet members 10 and 50 generate a bias flux which flows through the magnetic circuit of the motor along the path 90 from the north (N) pole of magnet 50 along through stator piece 45 to the shaded pole 46, then radially across the rotor-stator air gap and the rotor 55 to the shaded pole 16, along the pole 16 and then through stator piece 15 to the south (S) pole of magnet 10 making a complete magnetic circuit. The gap 120 between stator pole pieces 15 and 45 is provided to ensure that the bias flux flows along the stator poles.

In the quiescent condition, when the field coil 30 is de-energized, the direction of the bias flux from magnets 10 and 50 which passes through rotor 55 is such that the rotor 55 assumes the alignment shown in FIGURE 5. In this orientation the south (S) region of the rotor is attracted by and aligned opposite the stator pole 46 which is magnetically connected to the north (N) poles of the magnet 50; correspondingly, the north (N) pole region of the rotor is aligned opposite the stator pole 16 which is linked to the south (S) pole of the bias magnet 10. Each time that the field coil is de-energized, and the motor returns to the quiescent condition, the rotor member 55 assumes the same orientation. That is, each of the polarized north (N) and south (S) regions on the rotor is aligned opposite the respective stator pole which is of different magnetic polarity by reason of its linkage to the bias magnets 10 and 50.

Upon energization of the field coil 30 with an electrical pulse of predetermined polarity and amplitude, a second magnetic flux is produced in the magnetic circuit of the motor which flows through the rotor member 55 in a direction directly opposite that of the bias flux produced by the permanent magnets 10 and 50. When a pulse of a polarity such that the left-hand side of the field coil 30, as viewed in FIGURE 5, becomes a north pole, and the right-hand side a south pole, the field coil flux flows along the path 92 from the north or left side of field coil 30, along through stator piece 15 to the shaded pole 16, then radially across the rotor-stator air gap and rotor 55 to shaded pole 46, along the pole 46 and then through stator piece 45 to return to the south or right side of field coil 30, completing the magnetic circuit.

Another field coil flux path is from the north or left side of field coil 30, along through stator piece 15, across the gap 120, and along through stator piece 45 to return to the south or right side of field coil 30.

The amplitude of the field coil flux flowing in the stator poles 16 and 46 is chosen so as to be sufficiently large to momentarily cancel out the influence in the rotor-stator air gap of the bias flux from the permanent magnets 10 and 50, and produce a net magnetic field in the opposite direction through the rotor 55. This reversal in direction of the composite stator flux acting on the rotor 55 produces forces of magnetic attraction and repulsion on the magnetized pole regions of the rotor 55 which cause this member to rotate 180° in space.

So long as the pulse of electrical energy applied to the field coil 30 is of sufficient amplitude to produce a composite flux through the rotor 55 in a direction opposite that of the bias flux, the rotor will remain in this new position, displaced 180° from its original or quiescent orientation. However, upon termination of the applied pulse and de-energization of the field coil 30, the flux flowing through the magnetic circuit of the motor reverts to that provided by the permanent magnets 10 and 50 alone which is oppositely directed from that produced by the field coil 30. A second reversal thus occurs in the net flux flow and the rotor 55 revolves an additional 180° to assume an equilibrium orientation with respect to the changed direction of the stator pole flux.

It is to be also pointed out that the presence of the biasing flux from the permanent magnet member assists the rotor in coming to a rapid stop after the electrical energizing pulse is removed from the field coil. Thus interaction of the biasing flux with the magnetized pole regions of the rotor works against the rotational momentum of the rotor and helps bring it to a halt at its quiescent position in less than a full cycle.

The rotational advance of the rotor member 55 upon each reversal of the flux in the air gap which occurs upon the termination of the energizing pulse to the field coil 30 is always in the same direction, and thus additive. The rotor completes a full cycle of revolution and returns to the quiescent position it occupied just prior to the application of the energizing pulse. The rotor thus rotates a full 360 mechanical degrees upon the application of each pulse.

The parts of the stator are assembled with the rotor 55 which is housed in the closed ended, cylindrical projection 60 of the adjacent gear box or case 100 (FIGURE 2). Referring to FIGURE 6 it will be noted that the rotor shaft 56 is mounted in the spaced bearings 57 and 58, thereby improving its stability. Although for this reason the use of the bearing 58 as well as the bearing 57 is particularly advantageous, in other embodiments the rotor shaft also is supported within the gear box, that is, to the right of the bearing 57 as viewed in FIGURE 6, with the result that the bearing 58 is not needed.

The field coil 30 includes two input leads which are supplied with D.C. pulses. The pulses may be the random output of some operative device or a series of unipolar pulses produced by any of a variety of suitable electronic, electromechanical or other means. One such arrangement uses a synchronized pulse source such as a tuning fork or other electromechanical oscillator. Where the source provides a continuous series of unipolar pulses the motor operates as a "brushless" or self-commutating D.C. motor.

The leads of field coil 30 are brought out the opening 18 in stator piece 15 illustrated in FIGURES 1 and 2.

The magnetic members 6, 15, 25, 35 and 45 may be stamped from cold rolled steel of suitable thickness or may be made of powdered iron. In a particular example the magnetic material may be .045 inch in thickness for discs about one inch in diameter.

Referring now to FIGURES 3 and 4, in another embodiment the permanent magnets 10 and 50 are replaced with a single annular strip of Plastiform tape 11 having the combined width of magnets 10 and 50. The strip 11 has a magnetic polarization such that the inside surface of the one half of its width which attaches to the flange 47 is a north (N) pole and the inside surface of the other one half width which attaches to flange 17 is a south pole. Strip 11 could be a complete ring, though in FIGURE 3 the ends of the strip are not shown as joined. If the permanent magnet strip 11 is made of material which is magnetized along its greater dimension, that is from the right side to the left side of annular strip 11 as viewed in FIGURE 3, then sleeve 6 is unnecessary.

In still another embodiment, illustrated in FIGURE 8, the permanent biasing magnets 12 and 51 and sleeve 7 are mounted on the inside of flanges 17 and 47. The field coil 31 is mounted on the outside of flanges 17 and 47, although in some cases theer are advantages in mounting the coil on the inside.

Although the use of a two pole rotor and a four pole stator gives the best results, other embodiments may have more rotor and stator poles. For example, if it be assumed that the rotor member 55 of the motor embodiment of FIGURES 1 and 2 is modified so as to have three pairs of poles of opposite magnetic polarity equally spaced about its periphery, then a 120° rotation of the rotor will be produced by each pulse. Upon the commencement of the pulse (and the first reversal of pole flux flow), the rotor progresses 60°, and upon the termination of the pulse (causing the second flux reversal), the rotor advances a further 60°. Thus, while the rotor has advanced only 120 mechanical degrees, it has effectively completed a full cycle of 360 electrical degrees.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention.

What is claimed is:

1. An electric rotating machine comprising a two-pole rotor of elongated cylindrical configuration having a greater length than diameter, a cylindrical stator structure including a field coil mounted coaxially with the rotor for generating a magnetic flux in said stator structure, the stator structure including only a single pair of shaded stator poles and only a single pair of unshaded stator poles in magnetic flux relationship with the rotor, said rotor having a quiescent stopping position in which each of the shaded stator poles is directly opposite one of the rotor poles, and permanent-magnet means in magnetic circuit relationship with a pair of said stator poles for generating a biasing magnetic flux passing through said rotor, the strength and direction of said bias flux through said rotor being respectively lesser than and opposed to said stator flux flowing through said rotor when said field coil is energized.

2. An electric rotating machine as in claim 1 in which the shaded stator poles are spaced closer to the rotor than said unshaded stator poles.

3. An electric rotating machine comprising a multi-part centrally orificed stator, a bipole rotor, having a greater length than diameter, within the stator orifice, the stator including opposite pairs of pole pieces each pole piece having only a single stator pole projecting perpendicularly from adjacent the margin of the stator orifice, half of the pole pieces being stacked with their stator poles projecting in opposite directions and respectively diametrically opposed to form a cylindrical array encompassing the rotor and radially spaced therefrom, a field coil encircling a portion of said stator for generating a magnetic flux in said stator when said field coil is energized with externally-derived electrical pulses, and permanent-magnet means for generating a biasing magnetic flux passing through said rotor which is of lesser strength and opposed to said stator flux flowing through said rotor when said field coil is energized.

4. An electric rotating machine as in claim 3 in which the adjacent stator poles are spaced at different radial distances from the rotor but the opposite stator poles are spaced the same radial distance from the rotor.

5. An electric rotating machine as in claim 4 in which selected stator poles are shaded and are closer to said rotor than the other poles.

6. An electric rotating machine as in claim 5 in which said permanent-magnet means is in magnetic circuit relationship with said shaded stator poles.

7. An electric rotating machine as in claim 6 in which one of the pole pieces in each pair is of cup-shaped configuration and the other pole piece in each pair comprises a flat disc disposed within, and in magnetic circuit relationship with the cup-shaped pole piece in that pair.

8. An electric rotating machine as in claim 7 in which each of said discs has a plurality of spaced-apart radial extensions which establish the magnetic circuit relationship.

9. An electric rotating machine as in claim 7 in which each pair of pole pieces includes a shading member between the pole pieces in each pair which encircles the pole projecting from the cup-shaped pole piece.

10. An electric rotating machine as in claim 7 in which said permanent magnet means comprises a permanent magnet having a pair of magnetic poles one of which is affixed to one of said cup-shaped pole pieces.

11. An electric rotating machine as in claim 10 in which said permanent-magnet means comprises a strip which is adhesively secured to said cup-shaped stator pole piece.

12. An electric rotating machine as in claim 7 in which said permanent-magnet means includes a permanent magnet having two opposite magnetic poles each of which is in magnetic circuit relationship with a different one of said cup-shaped stator pole pieces.

13. An electric rotating machine as in claim 12 wherein said magnet comprises a strip of material one portion of which contacts one of said cup-shaped pole pieces and is polarized generally in a radially outward direction, and another portion of which contacts the other of said cup-shaped pole pieces and is polarized generally in the opposite direction.

14. An eletcric rotating machine as in claim 7 in which said permanent-magnet means includes one strip of material contacting one of said cup-shaped pole pieces and polarized generally in a radially outward direction, and another strip of material contacting the other of said cup-shaped pole pieces and polarized generally in the opposite direction.

15. An electric rotating machine as in claim 10 in which said permanent magnet is affixed to the interior surface of said cup-shaped pole piece.

16. An electric rotating machine as in claim 13 in which said strip is affixed to the exterior of said cup-shaped pole pieces.

17. An electric rotating machine comprising a centrally orificed stator, a permanent magnet rotor having at least two poles and a greater length than a diameter, the stator including a pair of shaded poles and a pair of unshaded poles extending along the length of the rotor in an array encompassing the rotor, said poles being in spaced relationship from said rotor such that said shaded poles are closer to the rotor than the unshaded poles, and a permanent magnet member mounted on said stator structure for magnetically biasing said shaded poles to give the rotor a quiescent stopping position in which each rotor pole is opposite a shaded stator pole and has a magnetic polarity opposite that of the stator pole nearest to it.

18. An electric rotating machine as in claim 17 in which the ratio of the length to the diameter of the rotor is at least 1.25 to 1.

19. An electric rotating machine as in claim 17 in which the rotor is of a material that has high magnetic coercivity, low permeability and low specific gravity, and a magnetic energy product of at least $3.0 \times 10^6$ gauss-oersteds along the axis of magnetic orientation.

20. An electric rotating machine as in claim 17 in which the shaded stator pole in each of said pairs is in abutting relationship with the unshaded stator pole in the opposite pair.

21. An electric rotating machine as in claim 17 in which the two stator poles in each of said pairs are spaced from each other.

22. A stepper motor comprising a built up stator of stacked parts, each part including a disc member having a central orifice and a salient stator pole adjacent the orifice and projecting perpendicularly from the disc member, half of the disc members being stacked with their stator poles extending in opposite directions and respectively diametrically opposed to define a cylindrical array, a field coil having only two input leads and encircling portions of said stator for generating a magnetic flux therein, a rotor mounted within the stator and having a pair of magnetic poles, the rotor being of greater length than diameter, and band means embracing and securing the stator parts together including permanent-magnet means in magnetic circuit relationship with said stator for generating a magnetic biasing flux within said stator and passing through said rotor with a strength and direction of which is respectively less than and opposed to the flux generated by said field coil.

23. A stepper motor comprising a two-pole cylindrical rotor having a length to diameter ratio of at least 1.25 to 1, a centrally orificed stator structure including opposite pairs of pole piece, one of the pole pieces in each pair being of cup-shaped configuration and the other comprising a disc member in magnetic circuit relationship with the cup-shaped pole piece in that pair, both pole pieces in each pair having only a single stator pole projecting perpendicularly from adjacent the margin of the stator orifice, the poles in one pole piece pair projecting in a direction opposite to that of the poles in the other pole piece pair and along the length of the rotor in an array encompassing the rotor, a field coil having only two input leads encircling said array, said field coil being substantially enclosed within said cup-shaped pole pieces, there being means interposed between the cup-shaped pole piece and the disc member in each pair for shading the stator poles projecting from the cup-shaped pole pieces, said shaded poles being spaced closer to the rotor than the other poles in said stator structure, and means securing the cup-shaped pole piece portions together comprising permanent-magnet means affixed to said cup-shaped pole pieces for biasing each shaded pole with a magnetic polarity opposite that of the other shaded pole.

24. An electric rotating machine as in claim 1 in which said permanent magnet means comprises a strip of barium ferrite material which is secured to said cylindrical stator structure.

References Cited

UNITED STATES PATENTS

| 2,721,281 | 10/1955 | Morganson | 310—162 |
| 2,951,957 | 9/1960 | Eigeman | 310—164 |
| 2,981,855 | 4/1961 | Van Lieshout et al. | 310—163 |
| 3,014,141 | 12/1961 | Riggs | 310—156 |
| 3,119,941 | 1/1964 | Guiot | 310—49 |
| 3,253,169 | 5/1966 | Haydon et al. | 310—156 |
| 3,302,046 | 1/1967 | Brandwijk | 310—49 |
| 3,423,617 | 1/1969 | Kohlhagen | 310—49 |

WARREN E. RAY, Primary Examiner

U.S. Cl. X.R.

310—156, 164, 181, 257